(12) United States Patent
Spray

(10) Patent No.: US 11,560,674 B2
(45) Date of Patent: *Jan. 24, 2023

(54) SPRAY PAVING COATING AND METHOD

(71) Applicant: VENTURE CORPORATION, Great Bend, KS (US)

(72) Inventor: Orville Spray, Great Bend, KS (US)

(73) Assignee: VENTURE CORPORATION, Great Bend, KS (US)

( * ) Notice: Subject to any disclaimer, the term of this patent is extended or adjusted under 35 U.S.C. 154(b) by 111 days.

This patent is subject to a terminal disclaimer.

(21) Appl. No.: 17/125,152

(22) Filed: Dec. 17, 2020

(65) Prior Publication Data

US 2021/0102346 A1 Apr. 8, 2021

Related U.S. Application Data

(63) Continuation of application No. 15/894,188, filed on Feb. 12, 2018, now Pat. No. 10,889,941, which is a continuation-in-part of application No. 14/665,544, filed on Mar. 23, 2015, now Pat. No. 9,890,299.

(51) Int. Cl.
| | |
|---|---|
| *E01C 7/14* | (2006.01) |
| *E01C 7/35* | (2006.01) |
| *E01C 7/18* | (2006.01) |
| *E01C 11/00* | (2006.01) |
| *E01C 7/00* | (2006.01) |

(52) U.S. Cl.
CPC .............. *E01C 7/353* (2013.01); *E01C 7/142* (2013.01); *E01C 7/185* (2013.01); *E01C 11/005* (2013.01)

(58) Field of Classification Search
CPC .......... E01C 7/142; E01C 7/185; E01C 7/353; E01C 11/005

USPC .......................... 404/17–31, 72, 75, 101–118
See application file for complete search history.

(56) References Cited

U.S. PATENT DOCUMENTS

| | | |
|---|---|---|
| 1,794,317 A | 2/1931 | Perkins et al. |
| 2,012,496 A | 8/1935 | Carroll |
| 3,607,339 A | 9/1971 | Davies |
| 3,870,422 A | 3/1975 | Medico, Jr. |
| 3,870,426 A | 3/1975 | Kietzman et al. |
| 4,068,023 A | 1/1978 | Nielsen et al. |
| 4,256,734 A | 3/1981 | Smadja |

(Continued)

FOREIGN PATENT DOCUMENTS

AU 2008283888 B2 * 8/2008 ............. B32B 27/00

OTHER PUBLICATIONS

Office Action received in Canadian Patent Application No. 3089273, dated May 30, 2022, 3 pages.

*Primary Examiner* — Raymond W Addie
(74) *Attorney, Agent, or Firm* — Shook, Hardy & Bacon, LLP

(57) ABSTRACT

A paving mixture for application to a surface and a method for the same are provided. The mixture comprises a binding material layer applied to the surface to form a base layer on the surface, and an aggregate material layer applied on top of the binding material layer, wherein the binding material layer comprises at least 13% of the bitumen in the paving mixture by weight, the aggregate material layer contains an asphalt mixture that provides a road surface, and the aggregate material layer and the binding material layer are combined on the surface within 30 seconds of application of the binding material layer.

20 Claims, 2 Drawing Sheets

(56) References Cited

U.S. PATENT DOCUMENTS

| | | |
|---|---|---|
| 5,069,578 A | 12/1991 | Bense et al. |
| 5,092,706 A | 3/1992 | Bowen et al. |
| 5,153,026 A | 10/1992 | Reed et al. |
| 5,279,500 A | 1/1994 | Perrin et al. |
| 5,294,210 A | 3/1994 | Lemelson |
| 5,836,715 A | 11/1998 | Hendrix et al. |
| 5,895,173 A | 4/1999 | O'Brien et al. |
| 6,918,714 B2 | 7/2005 | Chambard |
| 7,753,618 B2 | 7/2010 | Constantz et al. |
| 7,802,941 B2 | 9/2010 | Wingo et al. |
| 8,329,250 B2 | 12/2012 | Exline et al. |
| 8,465,843 B2 | 6/2013 | Exline et al. |
| 8,764,340 B2 | 7/2014 | Campbell |
| 2003/0044522 A1 | 3/2003 | Isozaki |
| 2005/0135879 A1 | 6/2005 | Grubba et al. |
| 2009/0279952 A1 | 11/2009 | Hoppe |
| 2010/0047015 A1 | 2/2010 | Takamura et al. |
| 2010/0179251 A1 | 7/2010 | Wilson, Sr. |
| 2011/0038668 A1* | 2/2011 | Exline .................. C09D 195/00 404/82 |
| 2011/0206455 A1 | 8/2011 | Blacklidge |
| 2011/0222965 A1 | 9/2011 | Copp |
| 2011/0305508 A1 | 12/2011 | Reed et al. |
| 2012/0123969 A1 | 5/2012 | Messmer |
| 2013/0011195 A1* | 1/2013 | Bower ................ C04B 20/1051 404/31 |
| 2013/0022810 A1 | 1/2013 | Bower et al. |
| 2015/0147465 A1 | 5/2015 | Shaffer et al. |
| 2016/0208098 A1* | 7/2016 | Naidoo .................. C08L 95/00 |

* cited by examiner

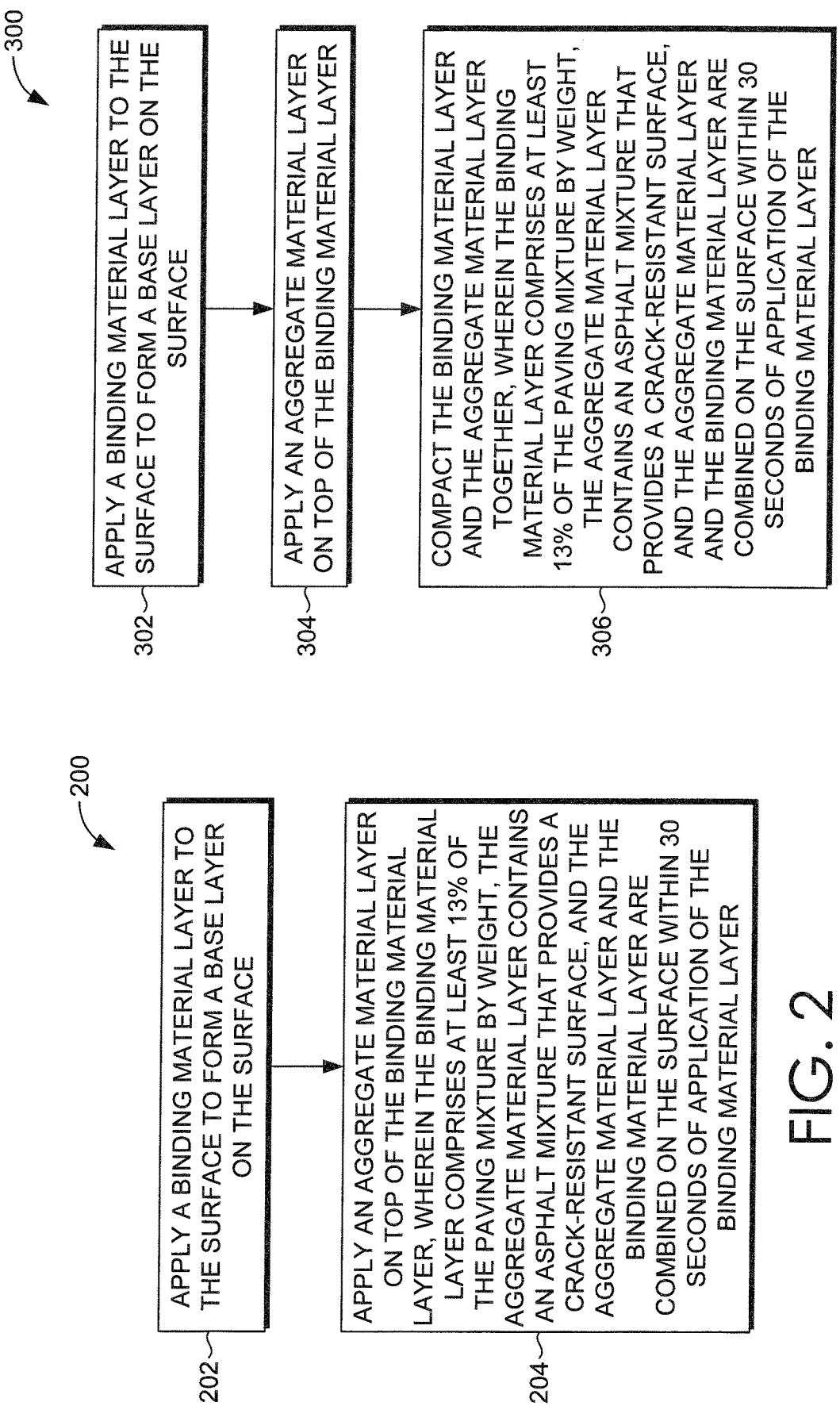

SPRAY PAVING COATING AND METHOD

CROSS-REFERENCE TO RELATED APPLICATIONS

This application is a continuation of prior application Ser. No. 15/894,188, filed Feb. 12, 2018, titled "SPRAY PAVING COATING AND METHOD," which is a continuation-in-part of U.S. patent application Ser. No. 14/665,544, filed Mar. 23, 2015, and titled "SPRAY PAVING COATING AND METHOD," the entirety of both which are hereby incorporated by reference.

FIELD OF THE INVENTION

The field of the invention relates to asphalt spray paving.

SUMMARY

Embodiments of the present invention are defined by the claims below, not this summary. This summary merely presents a high-level overview of various aspects of the invention and a selection of concepts that are further described below in the detailed description section. This summary is not intended to identify key or essential features of the claimed subject matter, nor is it intended to be used as an aid in isolation to determine the scope of the claimed subject matter. The scope of the invention is defined by the claims.

In a first aspect, a paving mixture for application to a road surface is provided, in accordance with an embodiment of the present invention. The mixture comprises a binding material layer applied to the surface to form a base layer on the surface, and an aggregate material layer applied on top of the binding material layer. The binding material layer comprises 13% or more of the bitumen in the paving mixture by volume. The aggregate material layer contains a mixture of aggregate and bitumen that provides a road surface. When constructed the paving mixture can be greater than 1.5 inches thick.

BRIEF DESCRIPTION OF THE SEVERAL VIEWS OF THE DRAWINGS

Illustrative embodiments of the present invention are described in detail below with reference to the attached drawing figures, wherein:

FIG. 2 depicts a first method of applying a paving mixture to a surface, in accordance with an aspect of the present invention; and FIG. 3 depicts a second method of applying a paving mixture to a surface, in accordance with an aspect of the present invention.

DETAILED DESCRIPTION

Figure 1:
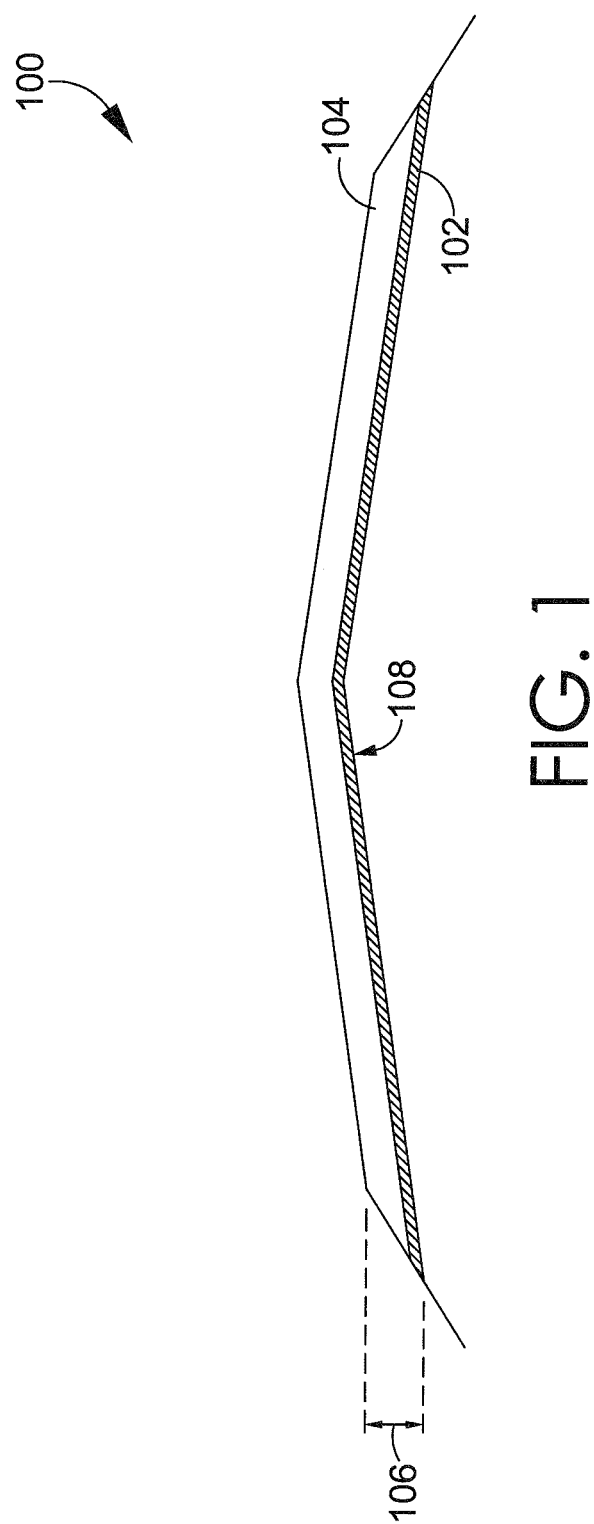
FIG. 1 depicts a paving mixture applied to a surface, in accordance with an embodiment of the present invention.

The subject matter of the various embodiments of the present invention is described with specificity in this disclosure to meet statutory requirements. However, the description is not intended to limit the scope of claims. Rather, the claimed subject matter may be embodied in various other ways to include different features, components, elements, combinations, and steps, similar to the ones described in this document, and in conjunction with other present and future technologies. Terms should not be interpreted as implying any particular order among or between various steps disclosed herein unless the stated order of steps is explicitly required. Many different arrangements of the various components depicted, as well as use of components not shown, are possible without departing from the scope of the claims below.

In one aspect, a paving mixture for application to a surface is provided. The mixture comprises a binding material layer that is applied to the surface to form a base layer on the surface. An aggregate material layer is then applied on top of the binding material layer, the binding and aggregate layers mixing to form a solid surface resistant to cracking and deformation. The binding material layer comprises 13% or more of the bitumen within the paving mixture by weight. For example, binding material layer can comprise 13% of the bitumen within the paving mixture by weight, 13.25% of the bitumen within the paving mixture by weight, 13.5% of the bitumen within the paving mixture by weight, 13.75% of the bitumen within the paving mixture by weight, 14% of the bitumen within the paving mixture by weight, 14.5% of the bitumen within the paving mixture by weight, or 15% of the bitumen within the paving mixture by weight. The aggregate material layer contains an asphalt mixture of bitumen and aggregate that provides a road surface. The aggregate material layer and the binding material layer can be combined on the surface within 30 seconds of application of the binding material layer to allow for adequate mixing of the layers and prevent undesired diffusion of the binding material layer on the surface.

In an embodiment, the paving mixture is a dense graded mix (e.g., Superpave, Marshall or Hveem procedures). The dense graded mix can be either fine-graded or coarse-graded. Fine-graded mixes have more fine and sand sized particles than coarse-graded mixes.

The paving mixture described herein can be used with any number of surfaces to provide an even, strong, water impermeable layer that is resistant to erosion and cracking. Surfaces to which the paving mixture may be applied include roads, streets, interstates, parking lots, airport runways, and other similar surfaces. For simplicity, all of these surfaces are described as "road surfaces" herein. These surfaces do not need to be a particular consistency, composition, or texture. The binding material layer combines with the aggregate material layer to give it elasticity, strength, and cohesion. The binding material layer also fills in cracks on the surface to which the paving mixture is applied. The aggregate material provides a firm structural component that will resist deformation.

The binding material layer provides a moisture barrier that prevents cracks under the applied paving mixture from deteriorating or expanding. Additionally, the combination of a binding layer and an aggregate layer provides a surface with a degree of elasticity that will resist cracking, molding, rutting, or similar deformation or damage, due to the binding layer providing a dynamic element to the aggregate material. In this regard, the binding material fills in the space, or gaps, between aggregate materials, providing a more consistent aggregate base material that has less air gaps and more cohesion.

The binding material may form a certain percentage of the overall bitumen in the paving mixture to provide adequate adhesion of the aggregate elements and proper dispersion of the binding material into the cracks on the surface. The amount of binding material used in the paving mixture may vary based on the desired performance and adhesion of the aggregate material. An ideal percentage of the binding material is 13% or more of the bitumen in the paving mixture by weight, which provides sufficient bonding and elasticity, while maintaining structural integrity from the aggregate material. The binding material may contains bitumen and other materials that form asphalt or similar surface forming materials, including sand, polymers, cross-linking agents, vulcanization agents, accelerators, extenders, and fluxing agents. The binding material may also form a polymer modified asphalt emulsion (PMAE) or hot-asphalt cement, a petroleum solvent cutback asphalt, and other similar or analogous compositions. The viscosity of the binding material layer may be varied with the addition of different materials or heat. Varying the viscosity provides different diffusion properties of the binding material across the surface to which it is applied, which may be desirable based on the amount of wear of the surface or the textural irregularities of the surface.

Heating the binding material decreases the viscosity, and helps to increase penetration of the binding material into cracks on the surface. Heating the binding material and/or aggregate material also helps to increase mixing of the binding material and the aggregate material once the layers are combined, providing a more uniform, durable paving mixture. When a liquid asphalt emulsion is used as the binding material, the asphalt emulsion may be formulated to have a low viscosity to help the binding material (i.e., asphalt emulsion) penetrate throughout the aggregate mixture, coating a higher percentage of the aggregate material in the aggregate material layer.

The aggregate material layer provides a structural component with compressive strength and durability. The aggregate material may comprise sand, gravel, crushed stone, slag, rock dust, and the like. The aggregate material may also include small or micro sized aggregate materials, or rather a pulverulent material, to provide a more densely packed or organized paving mixture. Exemplary pulverulent materials may include fine sand or dust, which enhance the consistency of the paving mixture by better distributing the aggregate materials throughout the paving mixture. This also allows the aggregate material to mix with the binding material more effectively, and reduces air gaps in the paving mixture. In addition to materials, the aggregate material may include a synthetic aggregate.

An asphalt solution comprising bitumen may be added to the aggregate mixture. The asphalt solution may be the same as or similar to the binding material, providing an adhesive or bonding element in the aggregate material layer. By including the asphalt solution, or binding element, in the aggregate mix, there is enhanced bonding between the aggregate materials prior to distribution over the binding material layer. A pulverulent material, such as sand or fine rock dust, may be added to the asphalt mix to help control the diffusion of the asphalt mix during application when the aggregate particles are otherwise large. Larger aggregate particles are desirable for structural support reasons, but may allow an asphalt mix to spread or run too quickly when the aggregate is applied to the surface. The asphalt solution or asphalt mixture may further comprise a bituminous material comprising at least one of asphalt cement, pitch, coal tar, vacuum tower bottoms, resid, performance grade asphalts, flux, and petroleum based products. The asphalt solution may comprise less than 85% of the aggregate material layer. Additionally, the asphalt contained in the aggregate mixture may coat some or all of the aggregate particles in the mixture to create a Hot Mix Asphalt (HMA), which may be appropriate in circumstances that require a high amount of diffusion of the binding material. An aggregate mixture is considered a HMA asphalt when the temperature of the aggregate mixture is at least 230 degrees Fahrenheit. A HMA provides increased distribution and uniformity of the binding material amongst the aggregate material in the aggregate material layer, due to the heat. A Warm Mix Asphalt (WMA) may also be used for similar purposes. An asphalt mix is considered a WMA when the asphalt is heated to at least 100 degrees Fahrenheit. A Cold Mix Asphalt (CMA) may also be used where the asphalt is approximately ambient temperature, and no enhanced diffusion of the binding material is desired. The type of asphalt used, and the heat applied, may be determined based on ambient conditions and the desired diffusion or mixing of the binding and aggregate materials, prior to any compaction.

The portion of the paving mixture that comprises the binding material or asphalt solution may be varied based on the amount of adhesion needed to allow the paving mixture to withstand wear, movement, deformation, and/or cracking. In a preferred embodiment, the binding material may be at least 13% of the bitumen in the paving mixture by weight. Additionally, the aggregate material may be applied such that the paving mixture forms a layer at least 1.25 inches thick after application, and/or compaction, for example 1.5 inches, 2 inches, 2.25 inches, 2.5 inches, 2.75 inches, 3 inches, 3.25 inches, 3.5 inches, 3.75 inches, or 4 inches.

The amount of binding material applied to the surface depends on the desired amount of surface treatment, and the desired thickness of the paving mixture product. In an embodiment, a distribution of 0.195 gallons/yd$^2$ of binding material may be applied to the surface to form a 1.25-inch thick surface. In an embodiment, a distribution of 0.235 gallons/yd$^2$ of binding material may be applied to the surface to form a 1.5-inch thick surface. In an embodiment, a distribution of 0.275 gallons/yd$^2$ of binding material may be applied to the surface to form a 1.75-inch thick surface. In an embodiment, a distribution of 0.315 gallons/yd$^2$ of binding material may be applied to the surface to form a 2-inch thick surface. In an embodiment, a distribution of 0.355 gallons/yd$^2$ of binding material may be applied to the surface to form a 2.25-inch thick surface. In an embodiment, a distribution of 0.395 gallons/yd$^2$ of binding material may be applied to the surface to form a 2.5-inch thick surface. In an embodiment, a distribution of 0.435 gallons/yd$^2$ of binding material may be applied to the surface to form a 2.75-inch thick surface. In an embodiment, a distribution of 0.470 gallons/yd$^2$ of binding material may be applied to the surface to form a 3-inch thick surface. In an embodiment, a distribution of 0.510 gallons/yd$^2$ of binding material may be applied to the surface to form a 3.25-inch thick surface. In an embodiment, a distribution of 0.550 gallons/yd$^2$ of binding material may be applied to the surface to form a 3.50-inch thick surface. In an embodiment, a distribution of 0.590 gallons/yd$^2$ of binding material may be applied to the surface to form a 3.75-inch thick surface. In an embodiment, a distribution of 0.630 gallons/yd$^2$ of binding material may be applied to the surface to form a 4.00-inch thick surface. In the above example embodiments, the specific gravity of the mix (Gmb) can be about 2.3, for example, 2.2, 2.3, 2.4, or 2.5. The residue in the Emulsion Bonding Liquid (EBL) can be about 65%. The pavement mixture density can be about 145 pounds per cubic foot (pcf). The depth of the aggregate material layer may be two or more times the depth of the binding material layer. This provides a stable surface and allows varying degrees of mixture between the binding material and the aggregate material, depending on the desired structural characteristics of the paving mixture.

The aggregate material may be applied to the binding material layer within a relatively short amount of time so that the binding material does not become too dispersed or diffuse on the surface after application. This time period may be less than 30 seconds, and even as short as a few seconds. As the aggregate material layer is applied to the binding material layer, the layers may be compacted into a tighter, more uniform layer of paving mixture, removing air gaps. This compacting can be accomplished mechanically, such as with a roller, pressing device, and/or machine. Compacting the binding layer and the aggregate layer together provides an even, uniform paving surface and also helps to distribute the binding material amongst the aggregate, providing a more stable, even paving mixture on the surface to which the paving mixture is applied.

In another aspect, a method for application of a paving mixture to a surface is provided. The method comprises applying a binding material layer to the surface to form a base layer on the surface, and applying an aggregate material layer on top of the binding material layer, wherein the binding material layer comprises 13 or more % of the bitumen in the paving mixture by weight, the aggregate material layer contains an asphalt mixture that provides a road surface, and the aggregate material layer and the binding material layer are combined on the surface within 30 seconds of application of the binding material layer.

The paving mixture may be applied by a vehicle that contains a binding material application component and an aggregate material application component. The binding material application component may apply the binding material layer ahead of the aggregate material layer, such as by spray paving, and may heat the binding material to a temperature that provides the desired viscosity or fluid properties. The aggregate material application component may apply the aggregate material on top of the binding material layer within 30 seconds or less of the binding material layer being applied to the surface. The aggregate material application component may also heat the aggregate material. The binding and aggregate layers may subsequently be compressed or compacted by a roller or a pressure application component. The binding material layer may comprise 13% or more of the bitumen in the paving mixture by weight, in a desired aspect.

In another aspect, a method for applying a paving mixture to a surface is provided, in accordance with an embodiment of the present invention. The method comprises applying a binding material layer to the surface to form a base layer on the surface, applying an aggregate material layer on top of the binding material layer, and compacting the binding material layer and the aggregate material layer together, wherein the binding material layer comprises at least 13% of the bitumen in the paving mixture by volume, the aggregate material layer contains an asphalt mixture that provides a road surface, and the aggregate material layer and the binding material layer are combined on the surface within 30 seconds of application of the binding material layer. As discussed herein, compacting of the binding material layer and the aggregate material layer may be accomplished using a roller machine or a mechanical compaction apparatus.

Referring to FIG. 1, an exemplary paving mixture applied to a surface is shown, in accordance with an embodiment of the present invention. In FIG. 1, a surface 108 is depicted with a paving mixture 100 applied on top of the surface 108 with an even distribution, which may result after mechanical compaction of the paving mixture 100. The paving mixture 100 includes a binding material layer 102 proximate to the surface 108, and an aggregate material layer 104 applied on top of the binding material layer 102. The paving mixture 100 has a thickness 106 of 3 inches after application and/or after compaction of the layers.

Referring to FIG. 2, a flowchart of a first exemplary method 200 of applying a paving mixture to a surface is provided, in accordance with an aspect of the present invention. In FIG. 2, at a first step 202, a binding material layer is applied to a surface to form a base layer on the surface. At a second step 204, an aggregate material layer is applied on top of the binding material layer, wherein the binding material layer comprises 13% or more of the bitumen in the paving mixture by weight, the aggregate material layer contains an asphalt mixture that provides a road surface, and the aggregate material layer and the binding material layer are combined on the surface within 30 seconds of application of the binding material layer.

Referring to FIG. 3, a second exemplary method 300 of applying a paving mixture to a surface is provided, in accordance with an aspect of the present invention. In FIG. 3, at a first step 302, a binding material layer is applied to a surface to form a base layer on the surface. At a second step 304, an aggregate material layer is applied on top of the binding material layer. At a third step 306, the binding material layer and the aggregate material layer are compacted, wherein the binding material layer comprises at least 13% of the bitumen in the paving mixture by weight, the aggregate material layer contains an asphalt mixture that provides a road surface, and the aggregate material layer and the binding material layer are combined on the surface within 30 seconds of application of the binding material layer.

Embodiments of the technology have been described to be illustrative rather than restrictive. Alternative embodiments will become apparent to readers of this disclosure. Further, alternative means of implementing the aforementioned elements and steps can be used without departing from the scope of the claims below, as would be understood by one having ordinary skill in the art. Certain features and subcombinations are of utility and may be employed without reference to other features and subcombinations, and are contemplated as within the scope of the claims.

The invention claimed is:

1. A paving mixture for a road surface, the mixture comprising:
    a bitumen binding material layer applied as a liquid and used to form a bitumen binding material layer of the road surface; and
    an aggregate material layer applied on top of the bitumen binding material layer,
    wherein the bitumen binding material layer comprises at least 13% of total bitumen in the paving mixture by weight,
    wherein the aggregate material layer comprises a mixture of aggregate and bitumen that provides a road surface and wherein the aggregate and bitumen are mixed prior to application to the bitumen binding material, and
    wherein the paving mixture is at least 2.5 inch thick after application.

2. The mixture of claim 1, wherein the binding material is applied in an amount of at least 0.395 gallons/yd² on the surface.

3. The mixture of claim 1, wherein the paving mixture is 3 inch thick.

4. The mixture of claim 1, wherein the paving mixture comprises a non-slag synthetic aggregate.

5. The mixture of claim 1, wherein the binding material layer and the aggregate material layer are at least 100 degrees Fahrenheit at the time of application.

6. The mixture of claim 1, wherein the binding material layer and the aggregate material layer are at least 230 degrees Fahrenheit at the time of application.

7. The mixture of claim 1, wherein at least a portion of the aggregate comprises a synthetic aggregate.

8. The mixture of claim 1, wherein the aggregate includes at least one material selected from the group consisting of sand, gravel, crushed stone, slag, and rock dust.

9. The mixture of claim 8, wherein the binding material is applied in an amount of at least 0.435 gallons/yd$^2$ on the surface.

10. The mixture of claim 8, wherein the bitumen comprises less than 13% of the aggregate material layer by weight.

11. A method of applying a paving mixture to a surface, the method comprising:
    applying a bitumen binding material as a liquid to the surface to form a bitumen binding material layer on the surface at a rate of 0.395 gallons/yd$^2$; and
    applying an aggregate material layer on top of the binding material layer,
    wherein the aggregate material layer comprises a mixture of aggregate and bitumen that provides a road surface and wherein the aggregate and bitumen are mixed prior to application to the bitumen binding material, and
    wherein the bitumen binding material layer comprises at least 13% of total bitumen in the paving mixture by weight.

12. The method of claim 11, further comprising heating the binding material layer and the aggregate material layer to at least 100 degrees Fahrenheit prior to application.

13. The method of claim 11, further comprising heating the binding material layer to at least 230 degrees Fahrenheit prior to application.

14. The method of claim 11, wherein the paving mixture is greater than 2.5 inches thick after application.

15. The method of claim 11, wherein the aggregate includes at least one material selected from the group consisting of sand, gravel, crushed stone, slag, and rock dust.

16. The method of claim 11, wherein at least a portion of the aggregate comprises a synthetic aggregate.

17. A method for applying a paving mixture to a surface, the method comprising:
    applying a bitumen binding material as a liquid to the surface to form a bitumen binding material layer on the surface;
    applying an aggregate material layer on top of the bitumen binding material layer; and
    compacting the bitumen binding material layer and the aggregate material layer together,
    wherein the bitumen binding material layer comprises at least 13% of total bitumen in the paving mixture by weight, and
    wherein the aggregate material layer comprises a mixture of aggregate and bitumen that provides a road surface and wherein the aggregate and bitumen are mixed prior to application to the bitumen binding material.

18. The method of claim 17, wherein the paving mixture is greater than 2.5 inches thick after application.

19. The method of claim 17, wherein the aggregate includes at least one material selected from the group consisting of sand, gravel, crushed stone, slag, and rock dust.

20. The method of claim 17, wherein the binding material is applied in an amount of at least 0.510 gallons/yd2 on the surface.

* * * * *